United States Patent
Ando et al.

(10) Patent No.: US 6,519,730 B1
(45) Date of Patent: Feb. 11, 2003

(54) COMPUTER AND ERROR RECOVERY METHOD FOR THE SAME

(75) Inventors: Hisashige Ando, Kawasaki (JP); Toshiaki Kitamura, Campbell, CA (US); Michael Shebanow, Campbell, CA (US); Michael Butler, Campbell, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/527,484

(22) Filed: Mar. 16, 2000

(51) Int. Cl.[7] .............................. G06F 11/00
(52) U.S. Cl. ........................ 714/746; 714/758
(58) Field of Search ................. 714/746, 758, 714/800

(56) References Cited

U.S. PATENT DOCUMENTS

| | | | | |
|---|---|---|---|---|
| 5,644,742 A | * | 7/1997 | Shen et al. | |
| 5,649,136 A | * | 7/1997 | Shen et al. | |
| 5,651,124 A | * | 7/1997 | Shen et al. | |
| 5,655,115 A | * | 8/1997 | Shen et al. | |
| 5,659,721 A | * | 8/1997 | Shen et al. | |
| 5,673,408 A | * | 9/1997 | Shebanow et al. | |
| 5,673,426 A | * | 9/1997 | Shen et al. | |
| 5,751,985 A | * | 5/1998 | Shen et al. | |
| 5,915,110 A | * | 6/1999 | Witt et al. | 712/239 |
| 5,946,648 A | * | 8/1999 | Witt et al. | 712/128 |
| 5,966,530 A | * | 10/1999 | Shen et al. | |
| 6,157,998 A | * | 12/2000 | Rupley, II et al. | 712/238 |

* cited by examiner

Primary Examiner—Phung M. Chung
(74) Attorney, Agent, or Firm—Fenwick & West LLP

(57) ABSTRACT

Disclosed is a computer in which an error caused by an intermittent failure is corrected by using a misprediction recovery mechanism which performs recovery processing if, after having predicted a branch destination of a branch instruction and speculatively executed an instruction at the predicted branch destination, it turns out that the branch prediction was wrong. The computer includes an error detection mechanism for detecting an error in logic operation of the computer, and an instruction re-execution mechanism for correcting an error caused by an intermittent failure when an error is detected by the error detection mechanism, by restoring the computer, using the misprediction recovery mechanism, to a state that existed before the occurrence of the error, and by re-executing a sequence of instructions including the instruction where the error is detected.

14 Claims, 5 Drawing Sheets

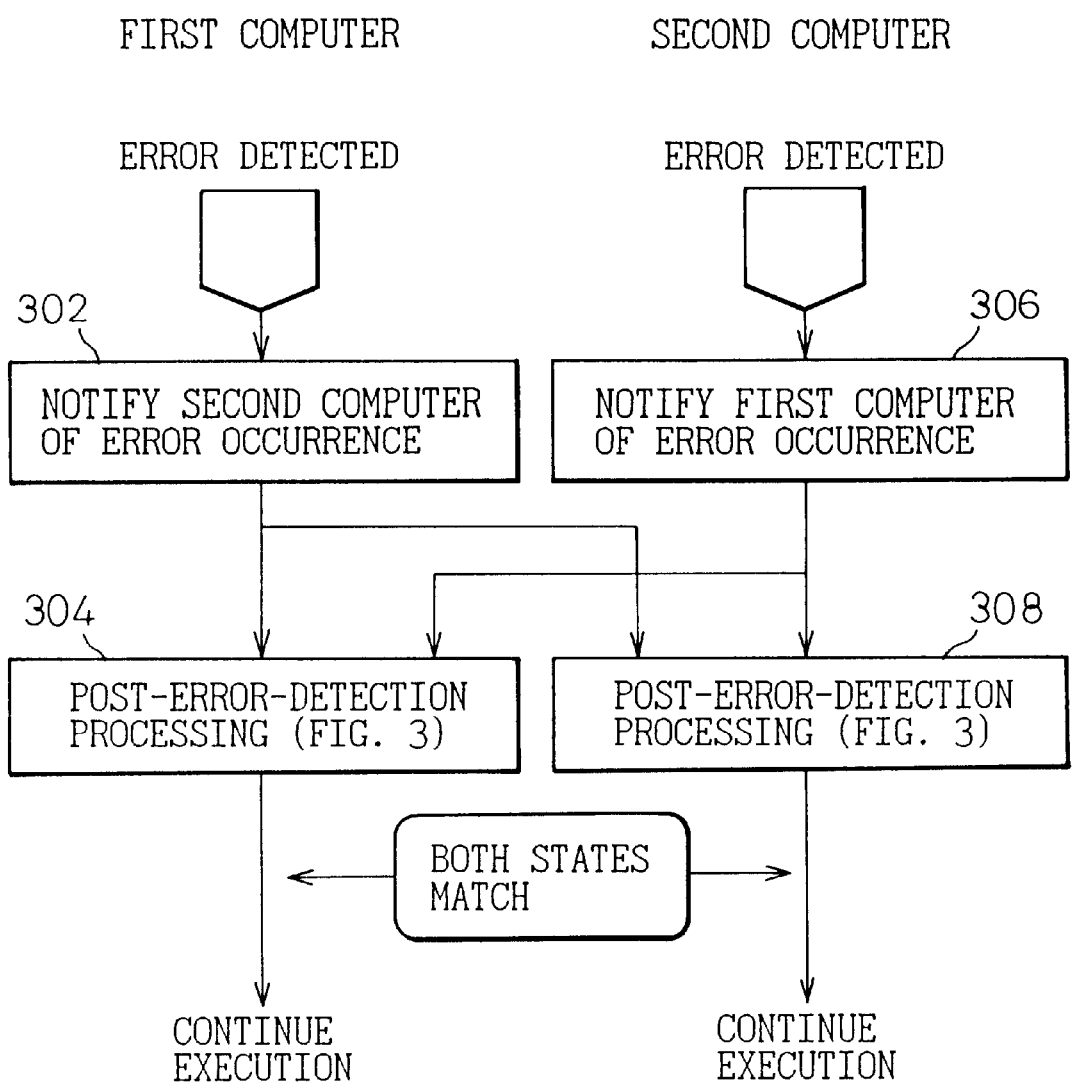

COMPUTER AND ERROR RECOVERY METHOD FOR THE SAME

BACKGROUND OF THE INVENTION

1. Field of the Invention

The present invention relates to a computer and an error recovery method for the same.

2. Description of the Related Art

In recent years, with advances in semiconductor technology, the speed of computers has been increasing. These advances in semiconductor technology, however, have entailed shrinking device sizes such as the size of MOS transistors used for computation and storage, and as a result, the resistance to radioactivity and internal or external noise has been decreasing, thus increasing the probability of error.

Various error correction schemes are known in the art that correct errors as they occur. For example, for memories which are more prone to error than other parts, error correction codes (ECCs) are used in order to guarantee stable operation. However, for parts other than memories, ECC codes are not often used because of their cost and performance constraints.

For the correction of errors that occur in parts other than memories, mainframe computers, of which high reliability is demanded, have traditionally employed a method such that when the execution of an instruction is completed, if there is no error, the next instruction is executed, but if an error is detected, the previous execution is re-executed. This method has had the problem that a high degree of instruction execution parallelism cannot be achieved, since the next instruction cannot be executed until after error checking has been done on the previous instruction.

On the other hand, in computers that perform instruction execution with a higher degree of parallelism, the state during operation is stored in a storage device and, if an error is detected, the previous state is restored from the storage device and the instruction execution is retried by returning to that state. This method has had the problem of increased cost because a storage device for storing the state during operation, which is not necessary for instruction execution itself, has to be provided.

Since causes for errors are often of an intermittent (transitory) nature, such as external noise or radioactivity, in either of the above methods the retried instruction(s) will, with a high probability of success, be executed correctly without encountering an error. Accordingly, the issue here is how error correction can be carried out when an error is detected in a logic operation, without decreasing the degree of instruction execution parallelism and without increasing the amount of hardware involved.

On the other hand, in many recent high-performance computers, an instruction execution technique called speculative execution is employed. In executing instructions in a computer, the execution efficiency of conditional branch instructions greatly affects the performance of the computer. When executing a conditional branch instruction in a conventional pipelined computer, first the instruction is identified as being a conditional branch instruction, then the branch condition is computed and the outcome checked, and finally the instruction at the branch destination is fetched for execution, requiring a minimum of three steps before the next instruction can be executed and thus taking correspondingly longer time before the execution of the next instruction.

By contrast, in speculative execution, upon identifying the instruction as being a conditional branch instruction, the direction of the branch is predicted using a branch prediction mechanism, and the instruction at the predicted branch destination is fetched for execution, thus requiring two steps before the next instruction can be executed. Since recent branch prediction mechanisms are able to predict the correct branch direction with a 90% or greater accuracy, efficient execution is possible most of the time.

However, there are cases where the prediction fails, and to prepare for such cases, it is practiced to store the state of the computer in a storage device. If it turns out that the prediction was wrong, the state that existed immediately before the branching occurred is restored from the storage device and the instruction execution is retried by correcting the direction of the branch.

SUMMARY OF THE INVENTION

The present invention has been devised in view of the above situation, and it is an object of the invention to provide an economical computer, and an error correction method for the same, wherein a state storage device provided as described above to prepare for a misprediction in speculative execution is also used when an error is detected in logic operation of the computer, thereby making it possible to correct errors caused by electrical noise or radioactive radiation.

To achieve the above object, according to the present invention, there is provided a computer equipped with a misprediction recovery mechanism which performs recovery processing if, after having predicted a branch destination of a branch instruction and speculatively executed an instruction at the predicted branch destination, it turns out that the branch prediction was wrong, said computer comprising: an error detection mechanism for detecting an error in logic operation of the computer; and an instruction re-execution mechanism for correcting an error caused by an intermittent failure when an error is detected by the error detection mechanism, by restoring the computer, using the misprediction recovery mechanism, to a state that existed before the occurrence of the error, and by re-executing a sequence of instructions including the instruction where the error is detected.

According to the present invention, there is also provided an error recovery method for a computer equipped with a misprediction recovery mechanism which performs recovery processing if, after having predicted a branch destination of a branch instruction and speculatively executed an instruction at the predicted branch destination, it turns out that the branch prediction was wrong, said method comprising the steps of: detecting an error in logic operation of the computer; and correcting an error caused by an intermittent failure when an error is detected, by restoring the computer, using the misprediction recovery mechanism, to a state that existed before the occurrence of the error, and by re-executing a sequence of instructions including the instruction where the error is detected.

BRIEF DESCRIPTION OF THE DRAWINGS

Further features and advantages of the present invention will be apparent from the following description with reference to the accompanying drawings, in which:

FIG. 5 is a flowchart illustrating the error correction processing performed in the system of FIG. 4.

DESCRIPTION OF THE PREFERRED EMBODIMENTS

Figure 1:
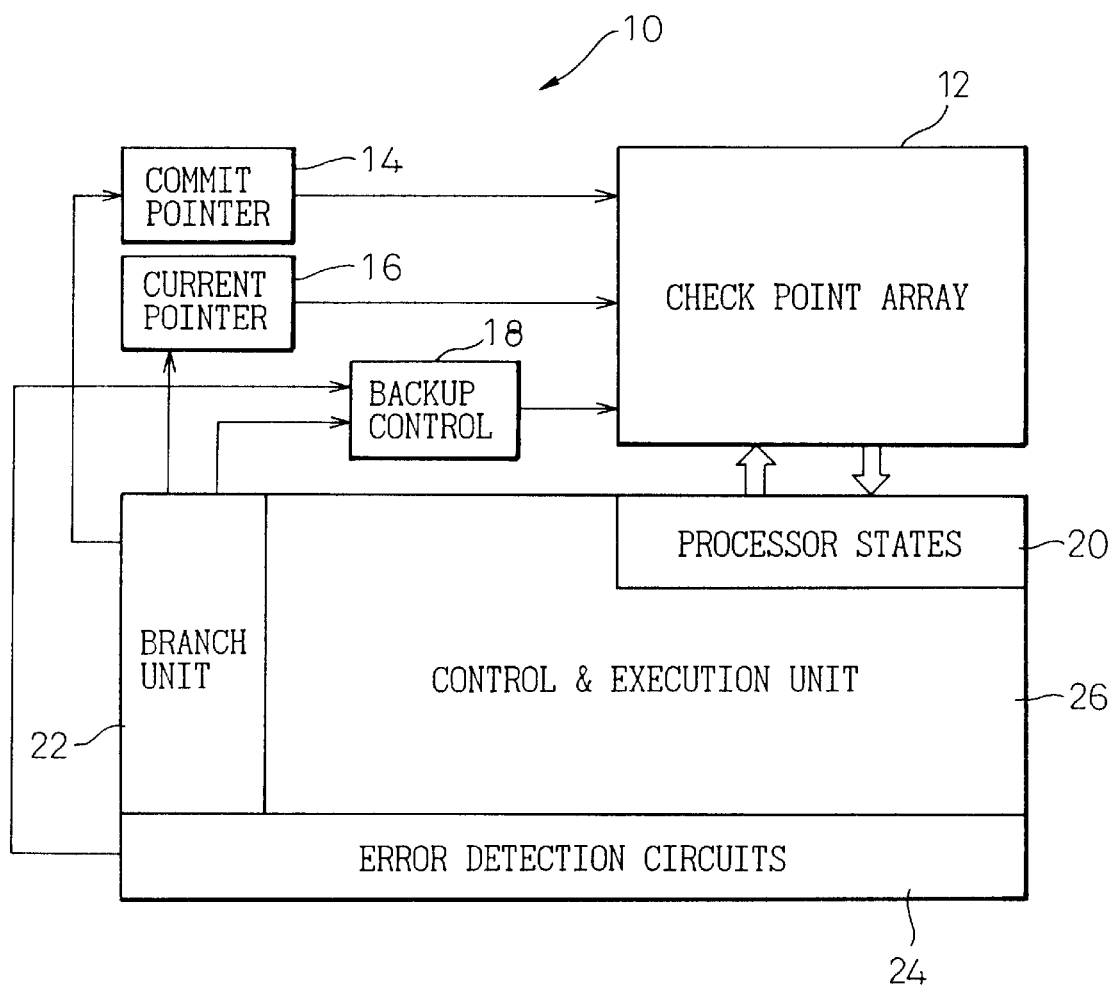
FIG. 1 is a block diagram showing the configuration of a computer designed to perform speculative execution of instructions and to detect errors in logic operation, the diagram focusing on the portion necessary for the description of the present invention.

FIG. 1 is a block diagram showing the configuration of a computer designed to perform speculative execution of instructions and to detect errors in logic operation, the diagram focusing on the portion necessary for the description of the present invention. Various methods are known for detecting errors in the logic operation of computers, such as a method that relies on parity check, a method that uses duplication and compares the result, or in the case of a multiplier, a method that checks a modulo-3 remainder. Errors can be detected by any of these methods or by a suitable combination of them.

In the computer designed to perform speculative instruction execution according to the present invention, when an error is detected by the error detection mechanism, an intermittent error is corrected by restoring the previous state from the state storage device and by re-executing instructions, as in the case of a branch misprediction. To achieve this, the following modification needs to be made to the conventional speculative execution method.

Computers that perform speculative execution use the concepts of instruction complete and instruction commit. Instruction complete is the state in which an instruction is executed and the result of the computation, etc. is obtained. However, when the instruction is executed based on speculative prediction, if the state of the computer is updated based on that result, the state cannot be restored in the event of a misprediction. To address this, an instruction commit stage is provided in which the instruction is committed only when it is confirmed that the prediction was correct after completing the execution of the instruction. In this way, an instruction at the instruction complete stage can be canceled, but once committed, the instruction cannot be canceled.

If an instruction that caused an error has committed, the instruction cannot be canceled and, therefore, the error cannot be corrected; accordingly, the present invention employs the configuration in which instructions are committed by not only checking the usual instruction commit condition but also confirming that no errors have occurred.

When an error is detected, the most recent state that contains only instructions committed without error, but does not contain the results of errored instructions, is restored by reading the state from the state storage device, and the execution of instructions is retried from the restored state. The mechanism provided for misprediction recovery can be used almost unchanged as the mechanism for accomplishing the above purpose. The major difference is that the same instruction sequence is re-executed, rather than executing a different instruction sequence by correcting the direction of the branch in case of mispredicted branch recovery.

A detailed description will be given below with reference to FIG. 1. The block labeled processor states 20 is a schematic representation of a program counter, register, etc., that is, a collection of states necessary for the execution of instructions; in an actual computer, these elements are usually mounted in several distributed locations. Instructions are executed with the entire computer 10 controlled based on the states held in the processor states 20.

In speculative execution, since the execution of an instruction is initiated based on prediction, if the prediction was wrong the instruction execution must be retried by returning to the previous correct state. This state is stored in a check point array 12. A commit pointer 14 points to the entry at which the last correct instruction commit state is stored. A current pointer 16 points to the entry at which the current state is stored when making the next prediction.

When a misprediction or malfunction occurs, a backup control 18 retrieves the state pointed to by the commit pointer 14 from the check point array 12 and stores the state in the processor states 20 so that the execution can be retried from that state.

The block labeled branch unit 22 is an element that handles branch instructions; this unit performs speculative execution by predicting the branch destination, and issues a notification if it turns out at a later time that the prediction was wrong. This unit also has the function of monitoring the instruction commit state and issuing a notification by detecting that the instructions have been committed up to the predicted point.

Error detection circuits 24 are a collection of elements for monitoring the logic operation of the computer 10. These elements are actually placed in many distributed locations. Parity check, residue check, or duplication comparison is used to detect a malfunction. A control and execution unit 26 represents the remaining portion of the computer.

To perform speculative execution by predicting the direction of the branch, the branch unit 22 stores the state (the contents of the processor states 20) existing immediately before the execution of the branch instruction, at the entry in the check point array 12 pointed to by the current pointer 16 before the branch destination is determined. Then, the execution of the instruction at the branch destination is initiated. Since the branch unit 22 made a prediction and thus consumed an entry in the check point array 12, the current pointer 16 is advanced by one. The branch unit 22 also monitors the instruction commit state and, when the instructions have been committed up to the entry next to the entry pointed to by the commit pointer 14, it then advances the commit pointer 14, thus performing control so that the commit pointer 14 always points to the last instruction commit state.

If it turns out that the direction of the branch was incorrectly predicted, the branch unit 22 notifies the backup control 18 accordingly. The backup control 18 reads out the last correctly committed entry from the check point array 12 by reference to the commit pointer 14, and restores the state of the processor states 20. Then, the computer resumes the instruction execution from that state (including the locations of the instructions to be executed). Since any subsequent prediction is canceled by this backup operation, the value of the current pointer 16 is updated so that it now points to the entry next to the entry pointed to by the commit pointer 14.

In the present invention, this misprediction recovery mechanism is used almost unchanged for the recovery from a malfunction. When the error detection circuits 24 for detecting a hardware malfunction notify the backup control 18 of the detection of a malfunction, the backup control 18 retrieves the correctly committed execution state pointed to by the commit pointer 14 and restores the state of the state processors 20, as in the case of a misprediction. Since the computer 10 resumes the instruction execution from this state, the instruction that caused the malfunction is also re-executed. If the cause of the malfunction is of a transitory nature, such as radioactive radiation or external noise, no errors will occur during the re-execution and the execution will be completed correctly. If the cause is noise induced by internal operation, the state of execution changes due to the re-execution and often, the amount of noise generated also changes. Accordingly, the probability that a malfunction will occur during the re-execution is low.

Figure 2:
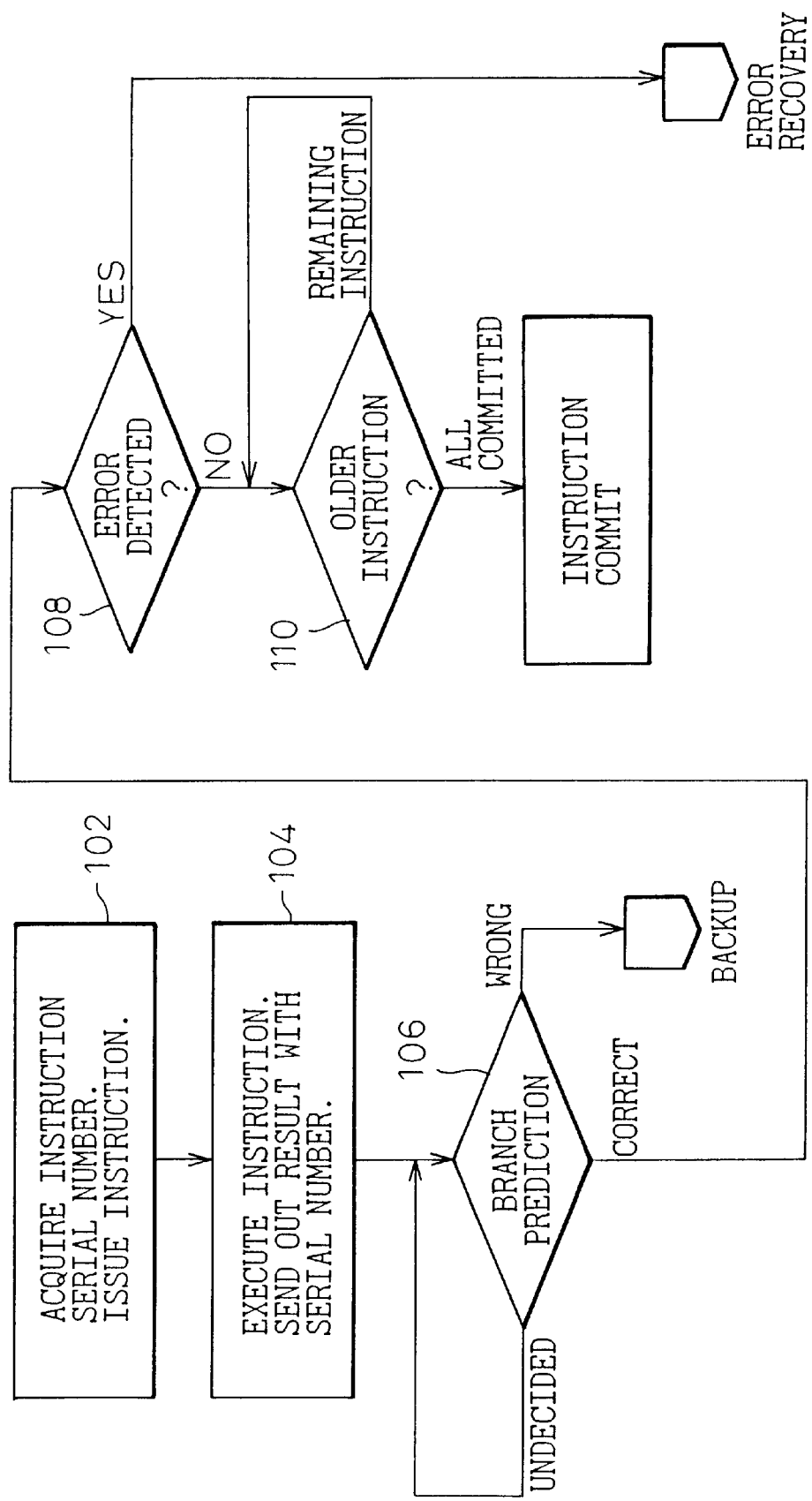
FIG. 2 is a flowchart illustrating an instruction committing procedure.

FIG. 2 is a flowchart illustrating an instruction committing procedure. The branch prediction, error detection, and instruction commit operations in the flowchart are performed in parallel and in pipelined manner for each instruction serial number. In step 102, the instruction serial number is fetched, and an instruction is issued. Next, in step 104, the instruction is executed, and the result of the execution with the serial number appended to it is sent out. In step 106, it is determined whether the branch prediction is correct or not, and if the prediction is incorrect, the process proceeds to the backup processing described above; if the prediction is correct, the process proceeds to step 108.

In step 108, it is determined whether an error has been detected or not; if an error has been detected, the process proceeds to the error recovery processing, but if no errors have been detected, the process proceeds to step 110. In step 110, the process waits until the instructions older than the current instruction are all committed; after that, the instruction is committed. In this way, in the present invention, detection of no errors is added as one of the conditions to commit instructions. Errors detected in mispredicted path will be ignored.

Figure 3:
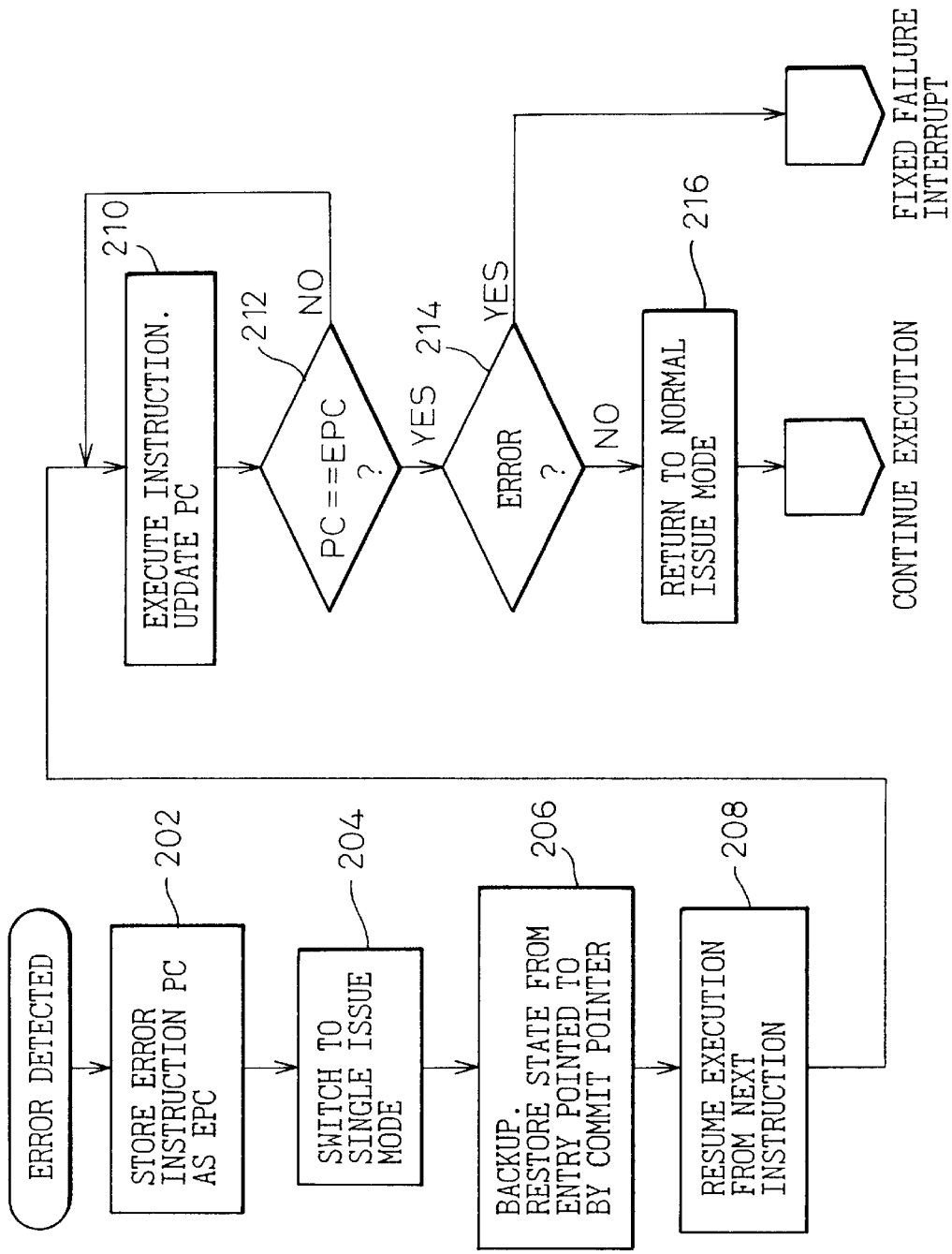
FIG. 3 is a flowchart illustrating a processing sequence after error detection.

FIG. 3 is a flowchart illustrating the processing sequence after error detection. The level of internally induced noise varies depending on the operating state, and generally the noise level is high in the case of a computer executing a plurality of instructions concurrently and thus having a high operating rate. Accordingly, in the re-execution of instructions, if the instructions are executed one at a time, rather than executing them in parallel, then the level of internal noise can be reduced, thus increasing the probability of success. In view of this, the processing of FIG. 3 includes an operation mode that produces less internal noise than normal execution mode, and when an error is detected, this operation mode is selected for the re-execution of instructions.

This method can correct, with a high probability of success, any errors caused by an intermittent failure, but if a fixed error has occurred that cannot be recovered by re-execution, or in the case of an intermittent failure, if the error has occurred in the state storage itself or in the recovery mechanism, such errors cannot be corrected. In the processing of FIG. 3, if an error is detected in the result of the re-execution, the execution is aborted by assuming that the error has been caused by a fixed failure.

More specifically, after the detection of an error, the value of the program counter (PC) pointing to the instruction that caused the error is stored as EPC in step 202. Next, in step 204, the instruction issue mode is changed to the single issue mode. In the normal issue mode, a plurality of instructions are issued in parallel using superscaler techniques, but in the single issue mode, the instruction are issued one at a time to reduce noise.

In step 206, the state is restored from the entry pointed to by the commit pointer 14 as a backup operation. Then, in step 208, the execution is resumed from the next instruction.

In step 210, the instruction is executed, and the program counter PC is updated. In step 212, it is determined whether the PC matches the EPC; if they do not match, the process returns to step 210, but if they match, the process proceeds to step 214.

In step 214, it is determined whether an error has been detected or not. If an error has been detected, the error is regarded as having been caused by a fixed failure, and an interrupt is raised. On the other hand, if no errors have been detected, the process proceeds to step 216 to resume the normal issue mode and continue the execution of instructions.

Figure 4:
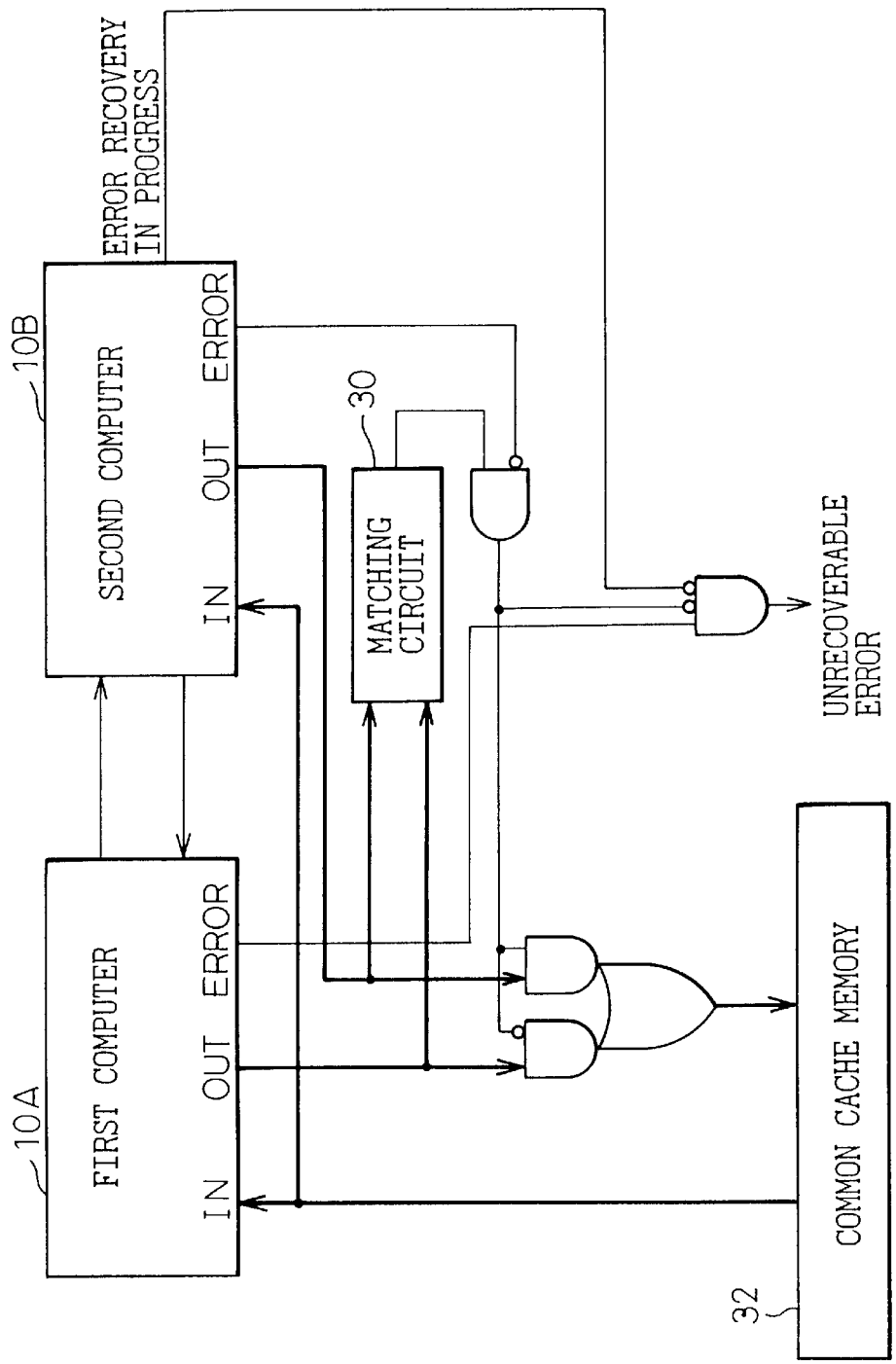
FIG. 4 is a block diagram for explaining an application example of the present invention in a system constructed by duplicating one computer with another.

When a higher degree of reliability is needed, the computer of the above configuration is duplicated with another computer, as shown in FIG. 4, and a mechanism for comparing the outputs of the two computers is added. That is, the output of the first computer 10A is constantly compared with the output of the second computer 10B by using a matching circuit 30. If an error is detected in the second computer 10B, or if an output mismatch is detected, the output of the first computer 10A is selected and stored in a common cache memory 32. In other words, as long as no errors are detected in the second computer 10B, and as long as both outputs match, the output of the second computer 10B is selected and stored in the common cache memory 32. If, when the output of the first computer 10A is selected, an error is detected in the first computer 10A, an unrecoverable error signal is generated.

In this way, if the outputs of the two computers do not match, the computer in which an error is detected is isolated, and the instruction execution is continued using the computer in which no errors are detected, thus allowing the correct execution to be continued without interruption. However, when an intermittent failure occurs in either one of the computers, if the state is restored only in that one computer, an output mismatch will occur. Therefore, if an error is detected, then provision must be made to restore the state simultaneously in both computers.

FIG. 5 shows a flowchart for explaining in detail the error correction processing performed in the system of FIG. 4. As shown in the flowchart, if an error is detected in the first computer 10A, in step 302 the first computer 10A notifies the second computer 10B of the occurrence of the error. Then, the post-error-detection processing shown in FIG. 3 is performed in both computers, as shown in steps 304 and 306. As a results, the states of both computers are maintained identical to each other. The same process is carried out when an error is detected in the second computer 10B.

In case this process can not synchronize two processors, the processor which detected a error will be isolated and the system continues execution with a single processor. Since the reliability degrades when the errored computer is isolated, diagnosis is performed at an appropriate time when the system operation can be stopped, and if a fixed failure is found, the failed hardware component is replaced. If no fixed failures are found, and if the cause is considered to be an unrecoverable intermittent failure, then the two computers are reconfigured to the original duplication comparison configuration to resume the operation.

In the case of a cache memory or the like protected by a parity check, if a malfunction is detected, re-execution is performed after the entry accessed at that time is nullified by hardware. By performing this control, since the nullified entry is accessed during the re-execution, the correct contents are read from a lower-order cache or the main memory, and the error is thus recovered. In this way, error recovery may be accomplished by also using such entry nullification processing or the like, rather than simply performing the re-execution.

In a cache memory protected by ECC, since correct data is supplied as the result of ECC, the execution can be continued using this correct data, while issuing an interrupt to notify the operating system (OS) of the occurrence of a correctable error to request for error recovery, and in the computer to which the present invention is applied, it is not an essential requirement that recovery be attempted, for every detected failure, by re-executing instructions. The method of the present invention may be used in combination with other malfunction correcting mechanism such as ECC.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A computer equipped with a misprediction recovery mechanism which performs recovery processing if, after having predicted a branch destination of a branch instruction and speculatively executed an instruction at said predicted branch destination, it turns out that said branch prediction was wrong, said computer comprising:

an error detection mechanism for detecting an error in logic operation of said computer; and an instruction re-execution mechanism for correcting an error caused by an intermittent failure when an error is detected by said error detection mechanism, by restoring said computer, using said misprediction recovery mechanism, to a state that existed before the occurrence of said error, and by re-executing a sequence of instructions including the instruction where said error is detected.

2. A computer as claimed in claim 1, wherein said error detection mechanism performs a parity check.

3. A computer as claimed in claim 1, wherein said error detection mechanism performs duplication comparison.

4. A computer as claimed in claim 1, wherein an instruction is committed on condition that it is confirmed by said error detection mechanism that said instruction has been executed without causing an error.

5. A computer as claimed in claim 1, wherein an operation mode that produces less internal noise than normal execution mode is provided, and said instruction re-execution mechanism performs the re-execution of instructions by selecting said operation mode when an error is detected by said error detection mechanism.

6. A computer as claimed in claim 1, wherein if an error is detected by said error detection mechanism during the re-execution by said instruction re-execution mechanism, the re-execution is aborted by assuming that said error has been caused by a fixed failure.

7. A computer system wherein a computer as claimed in any one of claims 1 to 6 is duplicated with another computer, and wherein, if a mismatch is detected between their outputs, the computer in which an internal operation error is detected is isolated, and execution of instructions is continued by using the other computer in which no errors are detected.

8. A computer system as claimed in claim 7, wherein if an internal operation error is detected in either one of said computers, re-execution of instructions is performed simultaneously in both of said computers.

9. An error recovery method for a computer equipped with a misprediction recovery mechanism which performs recovery processing if, after having predicted a branch destination of a branch instruction and speculatively executed an instruction at said predicted branch destination, it turns out that said branch prediction was wrong, said method comprising the steps of:

detecting an error in logic operation of said computer; and correcting an error caused by an intermittent failure when an error is detected, by restoring said computer, using said misprediction recovery mechanism, to a state that existed before the occurrence of said error, and by re-executing a sequence of instructions including the instruction where said error is detected.

10. A method as claimed in claim 9, wherein said error detection is accomplished by performing a parity check.

11. A method as claimed in claim 9, wherein said error detection is accomplished by performing duplication comparison.

12. A method as claimed in claim 9, further comprising the step of committing an instruction on condition that it is confirmed that said instruction has been executed without causing an error.

13. A method as claimed in claim 9, wherein said correction step performs the re-execution of instructions by selecting an operation mode that produces less internal noise than normal execution mode.

14. A method as claimed in claim 9, further comprising the step of aborting the re-execution of instructions if an error is detected during the re-execution, by assuming that said error has been caused by a fixed failure.

* * * * *